(12) United States Patent
Mathur et al.

(10) Patent No.: US 8,411,301 B2
(45) Date of Patent: Apr. 2, 2013

(54) DOCUMENT PRINTING BY SETTING TIME AND LOCATION BASED ON FACILITY/BUILDING MAP

(75) Inventors: Alok Mathur, Rancho Santa Margarita, CA (US); Andrey Savov, Fullerton, CA (US)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 847 days.

(21) Appl. No.: 12/266,043

(22) Filed: Nov. 6, 2008

(65) Prior Publication Data

US 2010/0110478 A1 May 6, 2010

(51) Int. Cl.
*H04N 1/40* (2006.01)
(52) U.S. Cl. ........................................ 358/1.15; 358/468
(58) Field of Classification Search .................. 358/1.9, 358/2.1, 468, 1.15–1.17, 400, 500, 402, 404, 358/426.12
See application file for complete search history.

(56) References Cited

U.S. PATENT DOCUMENTS

| | | | | |
|---|---|---|---|---|
| 5,287,194 | A | * | 2/1994 | Lobiondo ...................... 358/296 |
| 5,809,265 | A | * | 9/1998 | Blair et al. ..................... 715/764 |
| 7,576,883 | B2 | * | 8/2009 | Ragnet et al. ................. 358/1.15 |

* cited by examiner

*Primary Examiner* — Thomas D Lee
*Assistant Examiner* — Stephen M Brinich
(74) *Attorney, Agent, or Firm* — SoCal IP Law Group LLP; Steven C. Sereboff; Jonathan P. Pearce

(57) ABSTRACT

The subject application is directed to a system and method for location-based document output scheduling. At least one electronic document is first received into an associated data storage. A map is generated on an associated display, which map includes indicia corresponding to alternative facility locations associated with a selected event. The map also includes indicia corresponding to locations of alternative document rendering devices corresponding to the facility. Device selection data is received from an associated user of at least one document rendering device selected from the alternative document rendering devices as well as temporal data corresponding to a time of the selected event. Operation of each selected document rendering device is commenced so as to render the at least one electronic document at a timing corresponding to the temporal data.

20 Claims, 11 Drawing Sheets

DOCUMENT PRINTING BY SETTING TIME AND LOCATION BASED ON FACILITY/BUILDING MAP

BACKGROUND OF THE INVENTION

The subject application is directed generally to scheduled document rendering operations. The application is particularly applicable to efficiently scheduling and directing print jobs to coincide with a location of an individual or a forthcoming meeting.

Document processing devices in widespread use in office environments include printers, copiers, scanners, electronic mail clients, facsimile devices, and the like. More recently, two or more of these functions are provided in a single device, referred to as a multifunction peripheral (MFP) or multifunction device (MFD). The cost of procuring and maintaining of document processing devices frequently makes it advantageous to share such devices among a plurality of users via a networked data connection. By way of example, a user may wish to print a document from their workstation. They suitably select a printer that is conveniently located, and then subsequently retrieve the printout from the selected device.

Often many copies of a document need to be created for events, such as meetings. Such meetings may be in a remote location from where it is being submitted. Further, the meeting may be at some advanced timing, being scheduled days, weeks, or months in the future. It may not be necessary to print out multiple copies of such documents immediately. Additionally, changes in document content, number of copies, or location of meeting may change requirements for printing, or moot the requirement thereof.

SUMMARY OF THE INVENTION

In accordance with one embodiment of the subject application, there is provided a system and method for location-based document output scheduling. At least one electronic document is received into an associated data storage. A map is generated on an associated display, which map includes indicia corresponding to a plurality of alternative facility locations associated with a selected event as well as indicia corresponding to locations of a plurality of alternative document rendering devices. Device selection data is received from an associated user corresponding to at least one selected document rendering device selected from the plurality of alternative document rendering devices as well as temporal data corresponding to a time of the selected event. Operation of each selected document rendering device is commenced so as to render at least one electronic document at a timing corresponding to the temporal data.

Still other advantages, aspects and features of the subject application will become readily apparent to those skilled in the art from the following description wherein there is shown and described a preferred embodiment of the subject application, simply by way of illustration of one of the best modes best suited to carry out the subject application. As it will be realized, the subject application is capable of other different embodiments and its several details are capable of modifications in various obvious aspects all without departing from the scope of the subject application. Accordingly, the drawings and descriptions will be regarded as illustrative in nature and not as restrictive.

BRIEF DESCRIPTION OF THE DRAWINGS

The subject application is described with reference to certain figures, including.

DETAILED DESCRIPTION OF THE PREFERRED EMBODIMENT

The subject application is directed to a system and method for scheduling document rendering operations. In particular, the subject application is directed to a system and method for efficiently scheduling and directing print jobs to coincide with a location of an individual or a forthcoming meeting. More particularly, the subject application is directed to a system and method that enables location-based document output scheduling. It will become apparent to those skilled in the art that the system and method described herein are suitably adapted to a plurality of varying electronic fields employing output scheduling, including, for example and without limitation, communications, general computing, data processing, document processing, or the like. The preferred embodiment, as depicted in FIG. 1, illustrates a document processing field for example purposes only and is not a limitation of the subject application solely to such a field.

Figure 1:
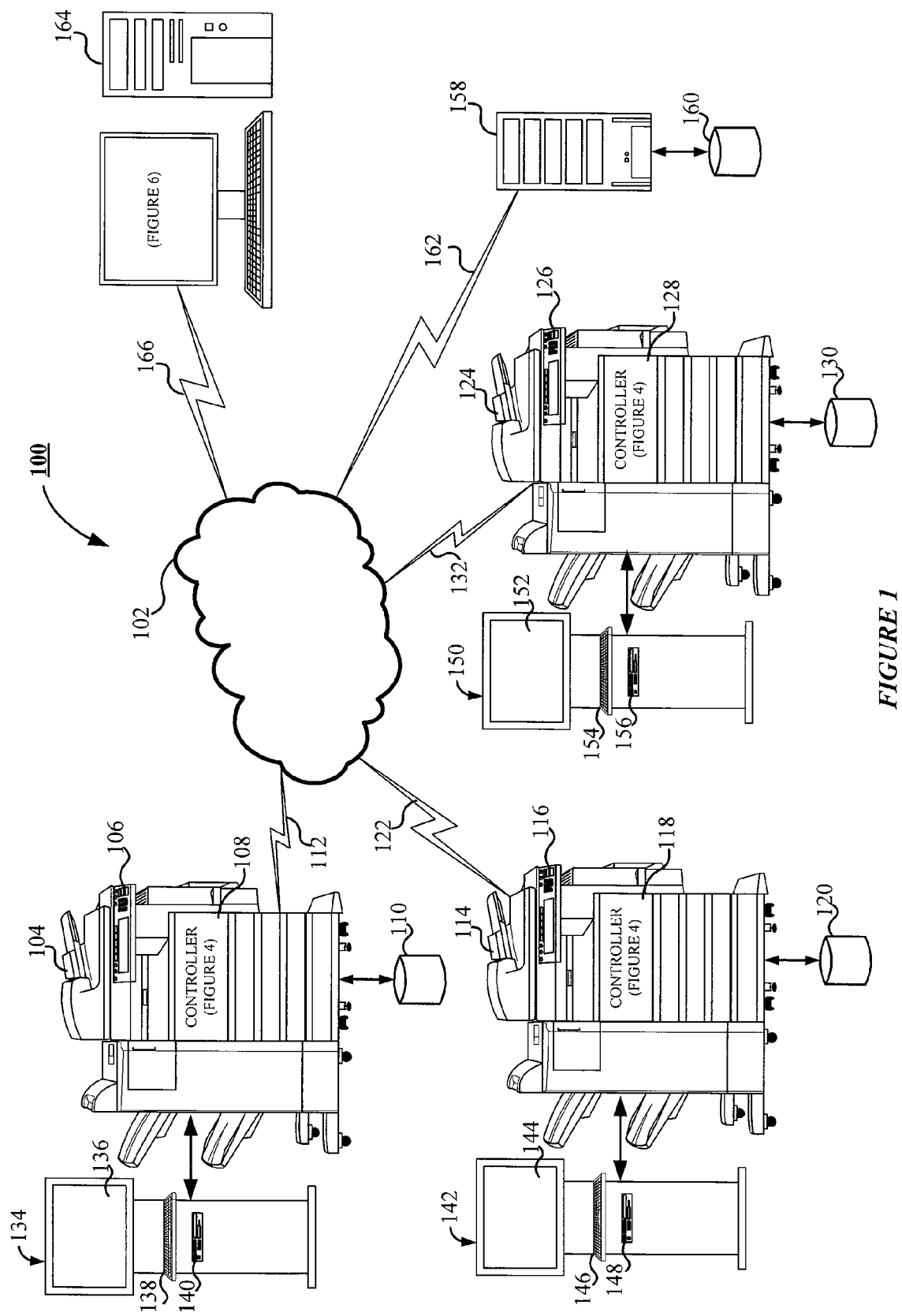
FIG. 1 is an overall diagram of a location-based document output scheduling system according to one embodiment of the subject application.

Referring now to FIG. 1, there is shown an overall diagram of a system 100 for location-based document output scheduling in accordance with one embodiment of the subject application. As shown in FIG. 1, the system 100 is capable of implementation using a distributed computing environment, illustrated as a computer network 102. It will be appreciated by those skilled in the art that the computer network 102 is any distributed communications system known in the art capable of enabling the exchange of data between two or more electronic devices. The skilled artisan will further appreciate that the computer network 102 includes, for example and without limitation, a virtual local area network, a wide area network, a personal area network, a local area network, the Internet, an intranet, or the any suitable combination thereof. In accordance with the preferred embodiment of the subject application, the computer network 102 is comprised of physical layers and transport layers, as illustrated by the myriad of conventional data transport mechanisms, such as, for example and without limitation, Token-Ring, 802.11(x), Ethernet, or other wireless or wire-based data communication mechanisms. The skilled artisan will appreciate that while a computer network 102 is shown in FIG. 1, the subject application is equally capable of use in a stand-alone system, as will be known in the art.

The system 100 also one or more document rendering devices, depicted in FIG. 1 as the document rendering devices 104, 114, and 124. As shown in FIG. 1, the document rendering devices 104, 114, and 124 are illustrated as multifunction peripheral devices, suitably adapted to perform a variety of document processing operations. It will be appreciated by those skilled in the art that such document processing operations include, for example and without limitation, facsimile, scanning, copying, printing, electronic mail, document management, document storage, or the like. Suitable commercially available document rendering devices include, for example and without limitation, the Toshiba e-Studio Series Controller. In accordance with one aspect of the subject application, the document rendering devices 104, 114, and 124 are suitably adapted to provide remote document processing services to external or network devices. Preferably, the document rendering devices 104, 114, and 124 include hardware, software, and any suitable combination thereof, configured to interact with an associated user, a networked device, or the like.

According to one embodiment of the subject application, the document rendering devices 104, 114, and 124 are suitably equipped to receive a plurality of portable storage media, including, without limitation, Firewire drive, USB drive, SD, MMC, XD, Compact Flash, Memory Stick, and the like. In the preferred embodiment of the subject application, the document rendering devices 104, 114, and 124 further include associated user interfaces 106, 116, and 126, such as a touch-screen, LCD display, touch-panel, alpha-numeric keypad, or the like, via which an associated user is able to interact directly with the document rendering devices 104, 114, and 124. In accordance with the preferred embodiment of the subject application, the user interfaces 106, 116, and 126 are advantageously used to communicate information to associated users and receive selections from such associated users.

The skilled artisan will appreciate that the user interfaces 106, 116, and 126 comprise various components, suitably adapted to present data to associated users, as are known in the art. In accordance with one embodiment of the subject application, the user interfaces 106, 116, and 126 comprise a display, suitably adapted to display one or more graphical elements, text data, images, or the like, to an associated user, receive input from the associated user, and communicate the same to a backend component, such as controllers 108, 118, and 128, as explained in greater detail below. Preferably, the document rendering devices 104, 114, and 124 are communicatively coupled to the computer network 102 via suitable communications links 112, 122, and 132. As will be understood by those skilled in the art, suitable communications links include, for example and without limitation, WiMax, 802.11a, 802.11b, 802.11g, 802.11(x), Bluetooth, the public switched telephone network, a proprietary communications network, infrared, optical, or any other suitable wired or wireless data transmission communications known in the art.

The functioning of the document rendering devices 104, 114, and 124 will be better understood in conjunction with the block diagrams illustrated in FIGS. 2 and 3, explained in greater detail below.

In accordance with one embodiment of the subject application, the document rendering devices 104, 114, and 124 further incorporate a backend component, designated as the controllers 108, 118, and 128, suitably adapted to facilitate the operations of their respective document rendering devices 104, 114, and 124, as will be understood by those skilled in the art. Preferably, the controllers 108, 118, and 128 are embodied as hardware, software, or any suitable combination thereof, configured to control the operations of the associated document rendering devices 104, 114, and 124, facilitate the display of images via the user interfaces 106, 116, and 126, direct the manipulation of electronic image data, and the like. For purposes of explanation, the controllers 108, 118, and 128 are used to refer to any myriad of components associated with the document rendering devices 104, 114, and 124, including hardware, software, or combinations thereof, functioning to perform, cause to be performed, control, or otherwise direct the methodologies described hereinafter. It will be understood by those skilled in the art that the methodologies described with respect to the controllers 108, 118, and 128 are capable of being performed by any general purpose computing system, known in the art, and thus the controllers 108, 118, and 128 are representative of such a general computing device and is intended as such when used hereinafter. Furthermore, the use of the controllers 108, 118, and 128 hereinafter is for the example embodiment only, and other embodiments, which will be apparent to one skilled in the art, are capable of employing the system and method for location-based document output scheduling of the subject application. The functioning of the controllers 108, 118, and 128 will better be understood in conjunction with the block diagrams illustrated in FIGS. 4 and 5, explained in greater detail below.

Communicatively coupled to the document rendering devices 104, 114, and 124 are data storage devices 110, 120, and 130. In accordance with the preferred embodiment of the subject application, the data storage devices 110, 120, and 130 are any mass storage device known in the art including, for example and without limitation, magnetic storage drives, a hard disk drive, optical storage devices, flash memory devices, or any suitable combination thereof. In the preferred embodiment, the data storage devices 110, 120, and 130 are suitably adapted to store document data, image data, electronic database data, or the like. It will be appreciated by those skilled in the art that while illustrated in FIG. 1 as being a separate component of the system 100, the data storage devices 110, 120, and 130 are capable of being implemented as internal storage components of the document rendering devices 104, 114, and 124, components of the controllers 108, 118, and 128, or the like, such as, for example and without limitation, an internal hard disk drive, or the like.

Illustrated in FIG. 1 are a first kiosk 134, communicatively coupled to the first document rendering device 104, and in effect, the computer network 102, a second kiosk 142, communicatively coupled to the second document rendering device 114, and in effect, the computer network 102, a third kiosk 150 communicatively coupled to the third document rendering device 124, and in effect the computer network 102. It will be appreciated by those skilled in the art that the kiosks 134, 142, and 150 are capable of being implemented as separate component of the respective document rendering devices 104, 114, and 124, or as integral components thereof. Use of the kiosks 134, 142, and 150 in FIG. 1 are for example purposes only, and the skilled artisan will appreciate that the subject application is capable of implementation without the use of kiosks 134, 142, and 150. In accordance with one embodiment of the subject application, the kiosks 134, 142, and 150 include respective displays 136, 144, and 152 and user input devices 138, 146, and 154. As will be understood by those skilled in the art the kiosks 134, 142, and 150 are capable of implementing a combination user input device/display, such as a touch screen interface. According to one embodiment of the subject application, the kiosks 134, 142, and 150 are suitably adapted to display selected advertisements to prospective customers, prompts to an associated user, receive instructions from the associated user, receive payment data, receive selection data from the associated user, and the like. Preferably, the kiosks 134, 142, and 150 include a magnetic card reader, conventional bar code reader, or the like, suitably adapted to receive and read payment data from a credit card, coupon, debit card, or the like.

The system 100 of FIG. 1 also includes portable storage device readers 140, 148, and 156, coupled to the kiosks 134, 142, and 150 and suitably adapted to receive and access a myriad of different portable storage devices. Examples of such portable storage devices include, for example and without limitation, flash-based memory such as SD, xD, Memory Stick, compact flash, CD-ROM, DVD-ROM, USB flash drives, or other magnetic or optical storage devices, as will be known in the art.

The system 100 illustrated in FIG. 1 further depicts a backend component, shown as the server 158, in data communication with the computer network 102 via a communications link 162. It will be appreciated by those skilled in the art that the server 158 is shown in FIG. 1 as a component of the system 100 for example purposes only, and the subject application is capable of implementation without the use of a separate backend server component. The skilled artisan will appreciate that the server 158 comprises hardware, software, and combinations thereof suitably adapted to provide one or more services, web-based applications, storage options, and the like, to networked devices. In accordance with one example embodiment of the subject application, the server 158 includes various components, implemented as hardware, software, or a combination thereof, for managing retention of secured documents, text data, performing searches, comparisons, maintaining database entries, account information, receiving payment data, retrieval of documents, and the like, which are accessed via the computer network 102. The communications link 162 is any suitable data communications means known in the art including, but not limited to wireless communications comprising, for example and without limitation Bluetooth, WiMax, 802.11a, 802.11b, 802.11g, 802.11 (x), a proprietary communications network, infrared, the public switched telephone network, optical, or any suitable wireless data transmission system, or wired communications known in the art. It will further be appreciated by those skilled in the art that the components described with respect to the server 158 are capable of implementation on any suitable computing device coupled to the computer network 102, e.g. the controllers 108, 118, 128, or the like.

Communicatively coupled to the server 158 is the data storage device 160. According to the foregoing example embodiment, the data storage device 160 is any mass storage device, or plurality of such devices, known in the art including, for example and without limitation, magnetic storage drives, a hard disk drive, optical storage devices, flash memory devices, or any suitable combination thereof. In such an embodiment, the data storage device 160 is suitably adapted to store mapping data, document rendering device location data, database entries, software updates, secured electronic documents, text data, data strings, account information, policy information, and the like. It will be appreciated by those skilled in the art that while illustrated in FIG. 1 as being a separate component of the system 100, the data storage device 160 is capable of being implemented as an internal storage component of the server 158, or the like, such as, for example and without limitation, an internal hard disk drive, or the like.

Also depicted in FIG. 1 is a user device, illustrated as a computer workstation 164 in data communication with the computer network 102 via a communications link 166. It will be appreciated by those skilled in the art that the computer workstation 164 is shown in FIG. 1 as a workstation computer for illustration purposes only. As will be understood by those skilled in the art, the computer workstation 164 is representative of any personal computing device known in the art including, for example and without limitation, a laptop computer, a personal computer, a personal data assistant, a web-enabled cellular telephone, a smart phone, a proprietary network device, or other web-enabled electronic device. According to one embodiment of the subject application, the workstation 164 further includes software, hardware, or a suitable combination thereof configured to interact with the document rendering devices 104, 114, and 124, communicate with the server 158, or the like. Preferably, the workstation 164 includes a suitable thin client interface, such as a web browser or other dedicated application, capable of interacting with various web pages, device pages, and the like.

The communications link 166 is any suitable channel of data communications known in the art including, but not limited to wireless communications, for example and without limitation, Bluetooth, WiMax, 802.11a, 802.11b, 802.11g, 802.11(x), a proprietary communications network, infrared, optical, the public switched telephone network, or any suitable wireless data transmission system, or wired communications known in the art. Preferably, the computer workstation 164 is suitably adapted to provide document data, job data, user interface data, image data, monitor document processing jobs, employ thin-client interfaces, generate display data, generate output data, or the like, with respect to the document rendering device 104, or any other similar device coupled to the computer network 102. The functioning of the computer workstation 164 will better be understood in conjunction with the block diagram illustrated in FIG. 6, explained in greater detail below.

Figure 2:
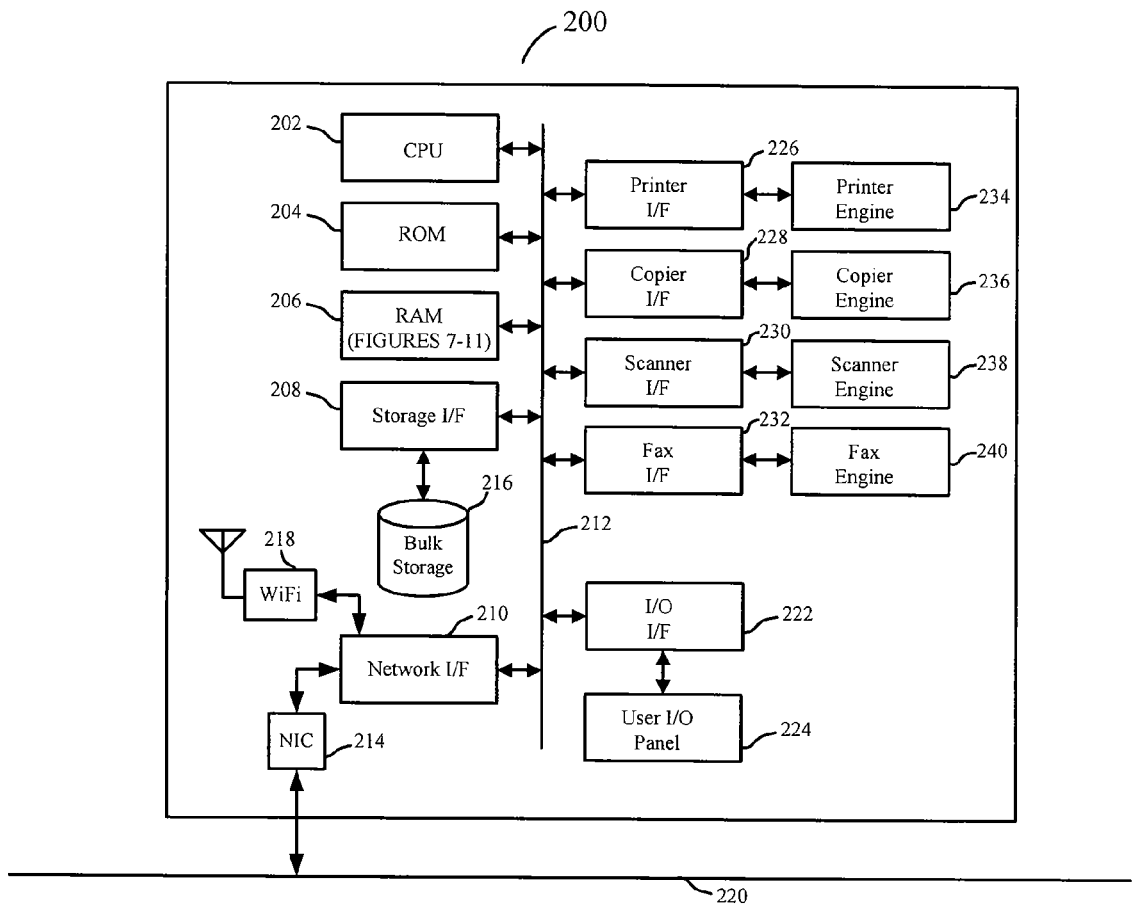
FIG. 2 is a block diagram illustrating device hardware for use in the location-based document output scheduling system according to one embodiment of the subject application.

Turning now to FIG. 2, illustrated is a representative architecture of a suitable device 200, shown in FIG. 1 as the document rendering devices 104, 114, and 124, on which operations of the subject system are completed. Included is a processor 202, suitably comprised of a central processor unit. However, it will be appreciated that the processor 202 may advantageously be composed of multiple processors working in concert with one another as will be appreciated by one of ordinary skill in the art. Also included is a non-volatile or read only memory 204 which is advantageously used for static or fixed data or instructions, such as BIOS functions, system functions, system configuration data, and other routines or data used for operation of the device 200.

Also included in the device 200 is random access memory 206, suitably formed of dynamic random access memory, static random access memory, or any other suitable, addressable memory system. Random access memory provides a storage area for data instructions associated with applications and data handling accomplished by the processor 202.

A storage interface 208 suitably provides a mechanism for volatile, bulk or long term storage of data associated with the device 200. The storage interface 208 suitably uses bulk storage, such as any suitable addressable or serial storage, such as a disk, optical, tape drive and the like as shown as 216, as well as any suitable storage medium as will be appreciated by one of ordinary skill in the art.

A network interface subsystem 210 suitably routes input and output from an associated network allowing the device 200 to communicate to other devices. The network interface subsystem 210 suitably interfaces with one or more connections with external devices to the device 200. By way of example, illustrated is at least one network interface card 214 for data communication with fixed or wired networks, such as Ethernet, token ring, and the like, and a wireless interface 218, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface card 214 is interconnected for data interchange via a physical network 220, suitably comprised of a local area network, wide area network, or a combination thereof.

Data communication between the processor 202, read only memory 204, random access memory 206, storage interface 208 and the network subsystem 210 is suitably accomplished via a bus data transfer mechanism, such as illustrated by the bus 212.

Suitable executable instructions on the device 200 facilitate communication with a plurality of external devices, such as workstations, document rendering devices, other servers, or the like. While, in operation, a typical device operates autonomously, it is to be appreciated that direct control by a local user is sometimes desirable, and is suitably accomplished via an optional input/output interface 222 to a user input/output panel 224 as will be appreciated by one of ordinary skill in the art.

Also in data communication with the bus 212 are interfaces to one or more document processing engines. In the illustrated embodiment, printer interface 226, copier interface 228, scanner interface 230, and facsimile interface 232 facilitate communication with printer engine 234, copier engine 236, scanner engine 238, and facsimile engine 240, respectively. It is to be appreciated that the device 200 suitably accomplishes one or more document processing functions. Systems accomplishing more than one document processing operation are commonly referred to as multifunction peripherals or multifunction devices.

Figure 3:
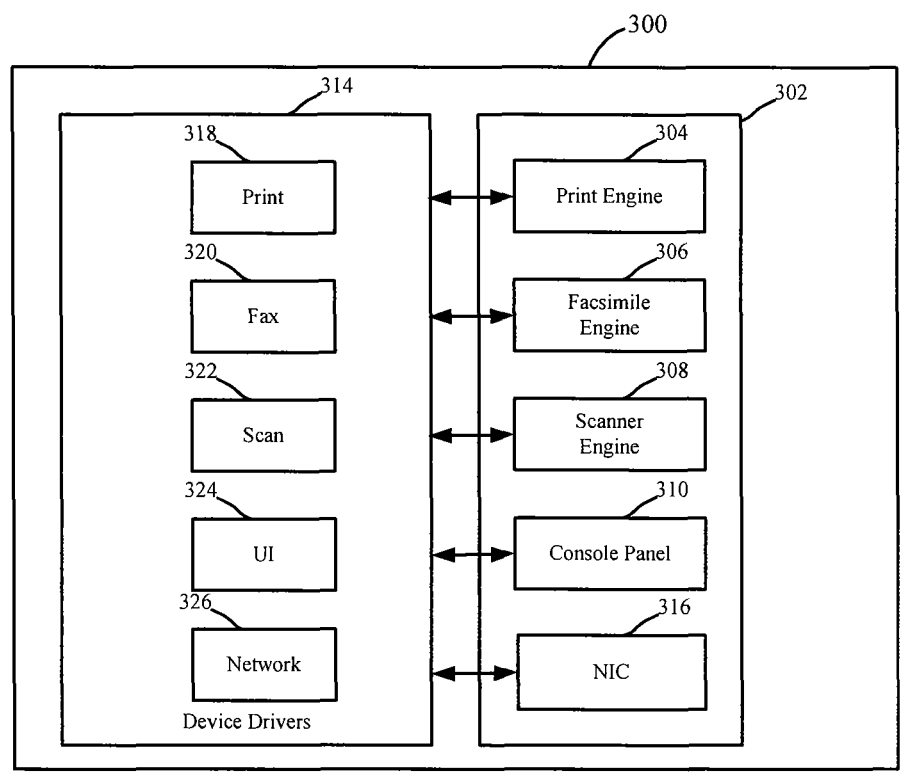
FIG. 3 is a functional diagram illustrating the device for use in the location-based document output scheduling system according to one embodiment of the subject application.

Turning now to FIG. 3, illustrated is a suitable document rendering device, depicted in FIG. 1 as the document rendering devices 104, 114, and 124, for use in connection with the disclosed system. FIG. 3 illustrates suitable functionality of the hardware of FIG. 2 in connection with software and operating system functionality as will be appreciated by one of ordinary skill in the art. The document rendering device 300 suitably includes an engine 302 which facilitates one or more document processing operations.

The document processing engine 302 suitably includes a print engine 304, facsimile engine 306, scanner engine 308 and console panel 310. The print engine 304 allows for output of physical documents representative of an electronic document communicated to the processing device 300. The facsimile engine 306 suitably communicates to or from external facsimile devices via a device, such as a fax modem.

The scanner engine 308 suitably functions to receive hard copy documents and in turn image data corresponding thereto. A suitable user interface, such as the console panel 310, suitably allows for input of instructions and display of information to an associated user. It will be appreciated that the scanner engine 308 is suitably used in connection with input of tangible documents into electronic form in bit-mapped, vector, or page description language format, and is also suitably configured for optical character recognition. Tangible document scanning also suitably functions to facilitate facsimile output thereof.

In the illustration of FIG. 3, the document processing engine also comprises an interface 316 with a network via driver 326, suitably comprised of a network interface card. It will be appreciated that a network thoroughly accomplishes that interchange via any suitable physical and non-physical layer, such as wired, wireless, or optical data communication.

The document processing engine 302 is suitably in data communication with one or more device drivers 314, which device drivers allow for data interchange from the document processing engine 302 to one or more physical devices to accomplish the actual document processing operations. Such document processing operations include one or more of printing via driver 318, facsimile communication via driver 320, scanning via driver 322 and a user interface functions via driver 324. It will be appreciated that these various devices are integrated with one or more corresponding engines associated with the document processing engine 302. It is to be appreciated that any set or subset of document processing operations are contemplated herein. Document processors which include a plurality of available document processing options are referred to as multi-function peripherals.

Figure 4:
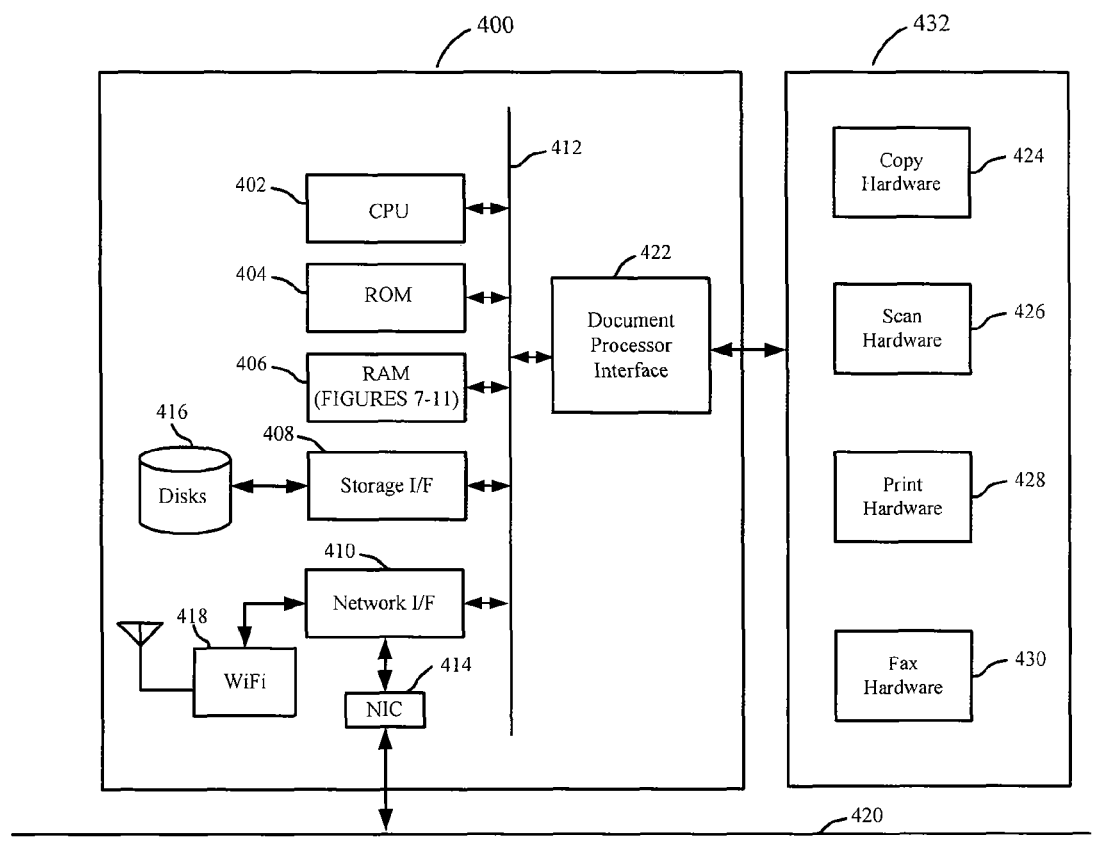
FIG. 4 is a block diagram illustrating controller hardware for use in the location-based document output scheduling system according to one embodiment of the subject application.

Turning now to FIG. 4, illustrated is a representative architecture of a suitable backend component, i.e., the controller 400, shown in FIG. 1 as the controllers 108, 118, and 128, on which operations of the subject system 100 are completed. The skilled artisan will understand that the controller 400 is representative of any general computing device, known in the art, capable of facilitating the methodologies described herein. Included is a processor 402, suitably comprised of a central processor unit. However, it will be appreciated that processor 402 may advantageously be composed of multiple processors working in concert with one another as will be appreciated by one of ordinary skill in the art. Also included is a non-volatile or read only memory 404 which is advantageously used for static or fixed data or instructions, such as BIOS functions, system functions, system configuration data, and other routines or data used for operation of the controller 400.

Also included in the controller 400 is random access memory 406, suitably formed of dynamic random access memory, static random access memory, or any other suitable, addressable and writable memory system. Random access memory provides a storage area for data instructions associated with applications and data handling accomplished by processor 402.

A storage interface 408 suitably provides a mechanism for non-volatile, bulk or long term storage of data associated with the controller 400. The storage interface 408 suitably uses bulk storage, such as any suitable addressable or serial storage, such as a disk, optical, tape drive and the like as shown as 416, as well as any suitable storage medium as will be appreciated by one of ordinary skill in the art.

A network interface subsystem 410 suitably routes input and output from an associated network allowing the controller 400 to communicate to other devices. The network interface subsystem 410 suitably interfaces with one or more connections with external devices to the device 400. By way of example, illustrated is at least one network interface card 414 for data communication with fixed or wired networks, such as Ethernet, token ring, and the like, and a wireless interface 418, suitably adapted for wireless communication via means such as WiFi, WiMax, wireless modem, cellular network, or any suitable wireless communication system. It is to be appreciated however, that the network interface subsystem suitably utilizes any physical or non-physical data transfer layer or protocol layer as will be appreciated by one of ordinary skill in the art. In the illustration, the network interface 414 is interconnected for data interchange via a physical network 420, suitably comprised of a local area network, wide area network, or a combination thereof.

Data communication between the processor 402, read only memory 404, random access memory 406, storage interface 408 and the network interface subsystem 410 is suitably accomplished via a bus data transfer mechanism, such as illustrated by bus 412.

Also in data communication with the bus 412 is a document processor interface 422. The document processor interface 422 suitably provides connection with hardware 432 to perform one or more document processing operations. Such operations include copying accomplished via copy hardware 424, scanning accomplished via scan hardware 426, printing accomplished via print hardware 428, and facsimile communication accomplished via facsimile hardware 430. It is to be appreciated that the controller 400 suitably operates any or all of the aforementioned document processing operations. Systems accomplishing more than one document processing operation are commonly referred to as multifunction peripherals or multifunction devices.

Figure 5:
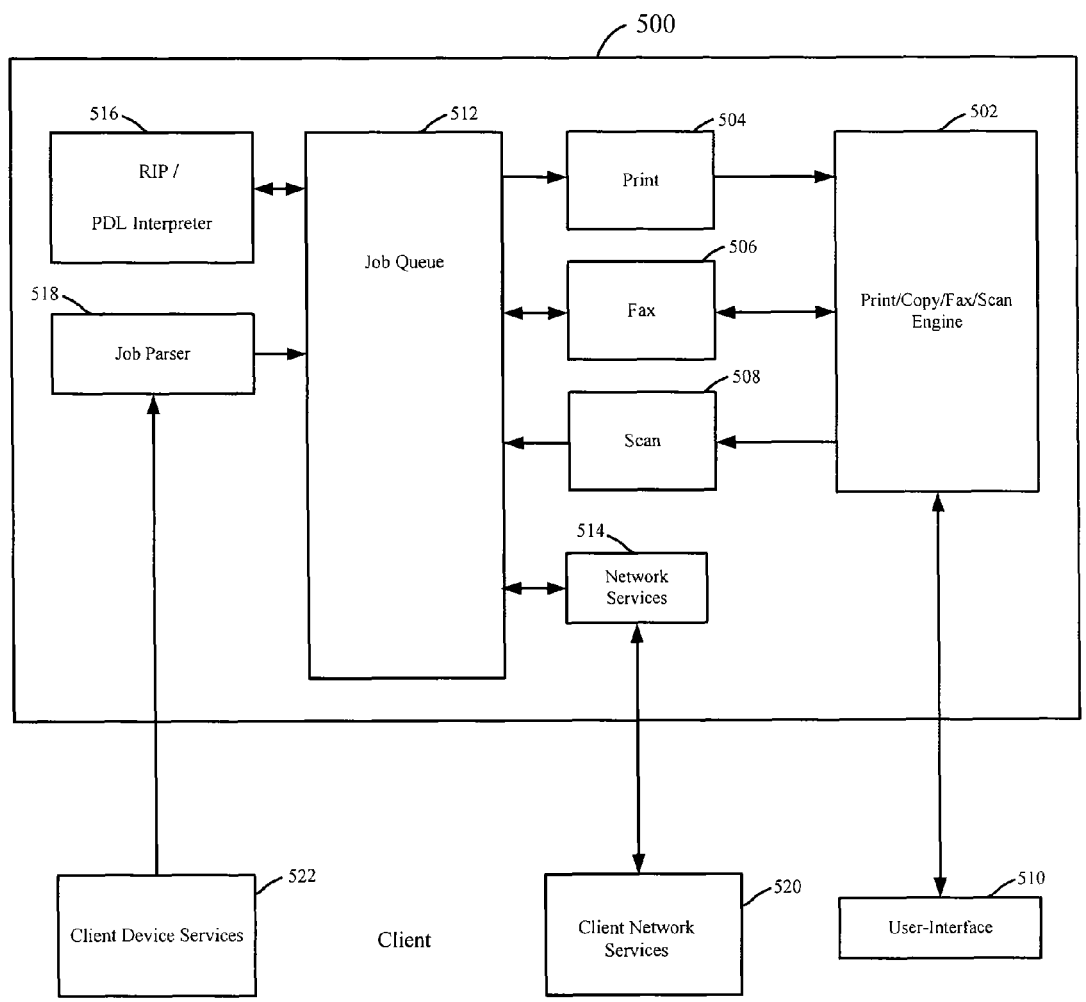
FIG. 5 is a functional diagram illustrating the controller for use in the location-based document output scheduling system according to one embodiment of the subject application.

Functionality of the subject system 100 is accomplished on a suitable document rendering device, such as the document rendering device 104, which includes the controller 400 of FIG. 4, (shown in FIG. 1 as the controllers 108, 118, and 128) as an intelligent subsystem associated with a document rendering device. In the illustration of FIG. 5, controller function 500 in the preferred embodiment, includes a document processing engine 502. A suitable controller functionality is that incorporated into the Toshiba e-Studio system in the preferred embodiment. FIG. 5 illustrates suitable functionality of the hardware of FIG. 4 in connection with software and operating system functionality as will be appreciated by one of ordinary skill in the art.

In the preferred embodiment, the engine 502 allows for printing operations, copy operations, facsimile operations and scanning operations. This functionality is frequently associated with multi-function peripherals, which have become a document processing peripheral of choice in the industry. It will be appreciated, however, that the subject controller does not have to have all such capabilities. Controllers are also advantageously employed in dedicated or more limited purposes document rendering devices that perform one or more of the document processing operations listed above.

The engine 502 is suitably interfaced to a user interface panel 510, which panel allows for a user or administrator to access functionality controlled by the engine 502. Access is suitably enabled via an interface local to the controller, or remotely via a remote thin or thick client.

The engine 502 is in data communication with the print function 504, facsimile function 506, and scan function 508. These functions facilitate the actual operation of printing, facsimile transmission and reception, and document scanning for use in securing document images for copying or generating electronic versions.

A job queue 512 is suitably in data communication with the print function 504, facsimile function 506, and scan function 508. It will be appreciated that various image forms, such as bit map, page description language or vector format, and the like, are suitably relayed from the scan function 308 for subsequent handling via the job queue 512.

The job queue 512 is also in data communication with network services 514. In a preferred embodiment, job control, status data, or electronic document data is exchanged between the job queue 512 and the network services 514. Thus, suitable interface is provided for network based access to the controller function 500 via client side network services 520, which is any suitable thin or thick client. In the preferred embodiment, the web services access is suitably accomplished via a hypertext transfer protocol, file transfer protocol, uniform data diagram protocol, or any other suitable exchange mechanism. The network services 514 also advantageously supplies data interchange with client side services 520 for communication via FTP, electronic mail, TELNET, or the like. Thus, the controller function 500 facilitates output or receipt of electronic document and user information via various network access mechanisms.

The job queue 512 is also advantageously placed in data communication with an image processor 516. The image processor 516 is suitably a raster image process, page description language interpreter or any suitable mechanism for interchange of an electronic document to a format better suited for interchange with device functions such as print 504, facsimile 506 or scan 508.

Finally, the job queue 512 is in data communication with a parser 518, which parser suitably functions to receive print job language files from an external device, such as client device services 522. The client device services 522 suitably include printing, facsimile transmission, or other suitable input of an electronic document for which handling by the controller function 500 is advantageous. The parser 518 functions to interpret a received electronic document file and relay it to the job queue 512 for handling in connection with the afore-described functionality and components.

Figure 6:
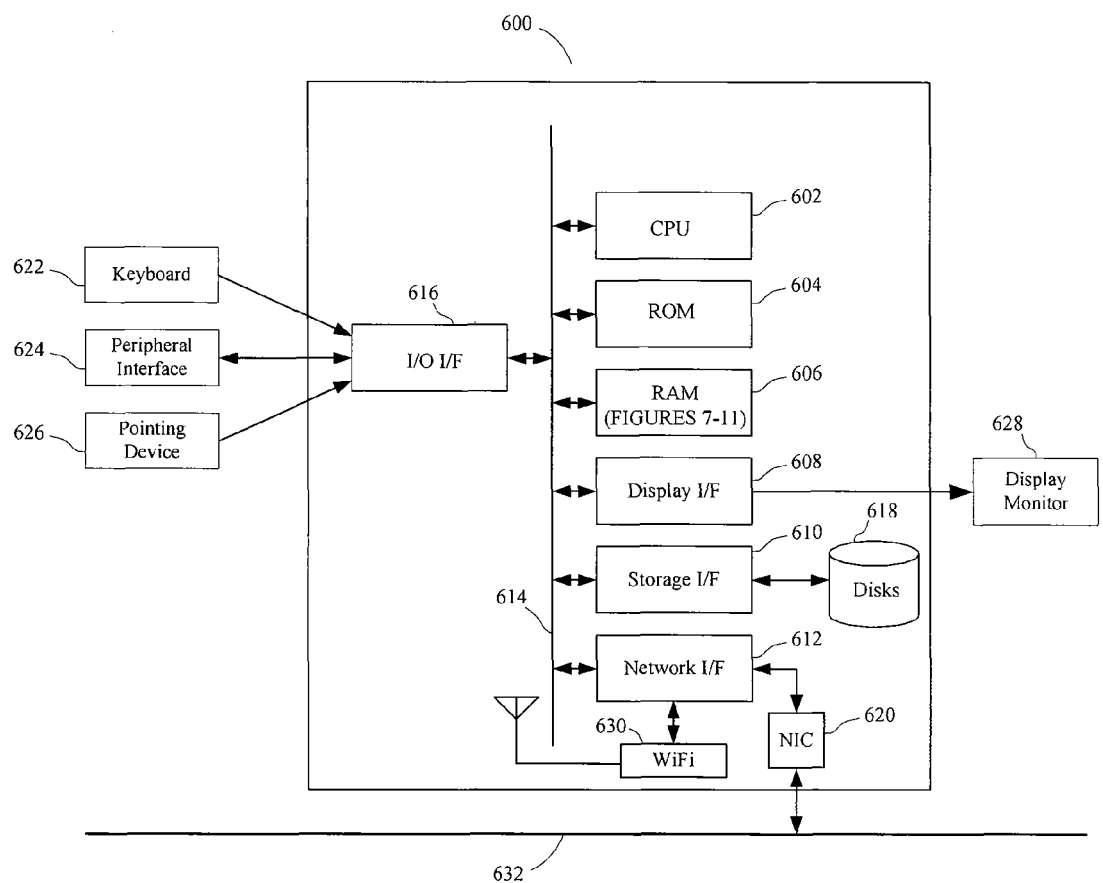
FIG. 6 is a functional diagram illustrating a workstation for use in the location-based document output scheduling system according to one embodiment of the subject application.

Turning now to FIG. 6, illustrated is a hardware diagram of a suitable workstation 600, shown in FIG. 1 as the computer workstation 164, for use in connection with the subject system. A suitable workstation includes a processor unit 602 which is advantageously placed in data communication with read only memory 604, suitably non-volatile read only memory, volatile read only memory or a combination thereof, random access memory 606, display interface 608, storage interface 610, and network interface 612. In a preferred embodiment, interface to the foregoing modules is suitably accomplished via a bus 614.

The read only memory 604 suitably includes firmware, such as static data or fixed instructions, such as BIOS, system functions, configuration data, and other routines used for operation of the workstation 600 via CPU 602.

The random access memory 606 provides a storage area for data and instructions associated with applications and data handling accomplished by the processor 602.

The display interface 608 receives data or instructions from other components on the bus 614, which data is specific to generating a display to facilitate a user interface. The display interface 608 suitably provides output to a display terminal 628, suitably a video display device such as a monitor, LCD, plasma, or any other suitable visual output device as will be appreciated by one of ordinary skill in the art.

The storage interface 610 suitably provides a mechanism for non-volatile, bulk or long term storage of data or instructions in the workstation 600. The storage interface 610 suitably uses a storage mechanism, such as storage 618, suitably comprised of a disk, tape, CD, DVD, or other relatively higher capacity addressable or serial storage medium.

The network interface 612 suitably communicates to at least one other network interface, shown as network interface 620, such as a network interface card, and wireless network interface 630, such as a WiFi wireless network card. It will be appreciated that by one of ordinary skill in the art that a suitable network interface is comprised of both physical and protocol layers and is suitably any wired system, such as Ethernet, token ring, or any other wide area or local area network communication system, or wireless system, such as WiFi, WiMax, or any other suitable wireless network system, as will be appreciated by one of ordinary skill in the art. In the illustration, the network interface 620 is interconnected for data interchange via a physical network 632, suitably comprised of a local area network, wide area network, or a combination thereof.

An input/output interface 616 in data communication with the bus 614 is suitably connected with an input device 622, such as a keyboard or the like. The input/output interface 616 also suitably provides data output to a peripheral interface 624, such as a USB, universal serial bus output, SCSI, Firewire (IEEE 1394) output, or any other interface as may be appropriate for a selected application. Finally, the input/output interface 616 is suitably in data communication with a pointing device interface 626 for connection with devices, such as a mouse, light pen, touch screen, or the like.

Figure 7:
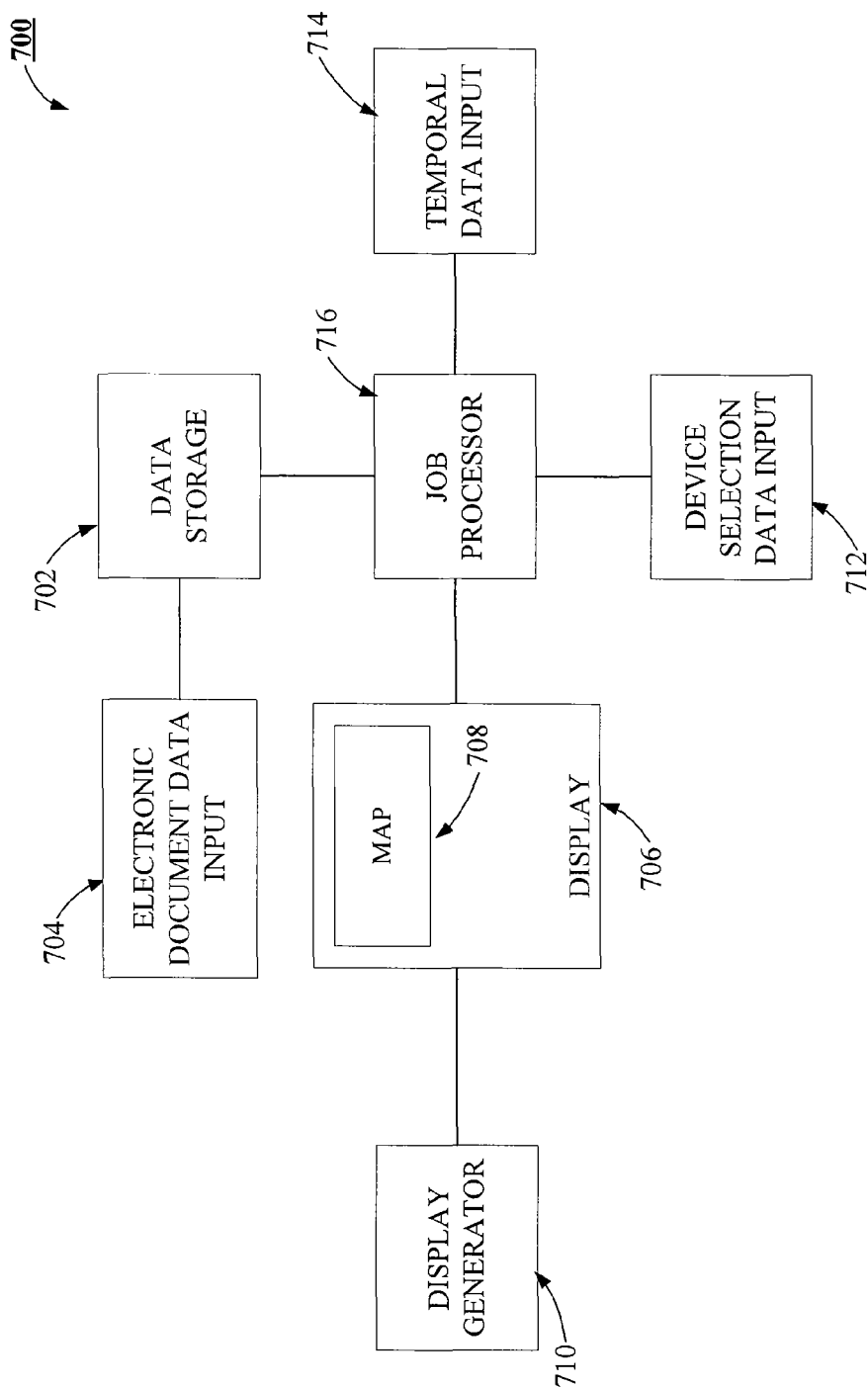
FIG. 7 is a block diagram illustrating the location-based document output scheduling system according to one embodiment of the subject application.

Referring now to FIG. 7, illustrated is a block diagram of a system 700 for location-based document output scheduling in accordance with one embodiment of the subject application. As shown in FIG. 7, the system 700 includes a data storage 702 configured to store a plurality of electronic documents, mapping data, location data, and the like. The system further includes an electronic document input 704 operable to receive at least one electronic document into the data storage 702. The system 700 also includes a display 706 and an associated display generator 710. The display generator 710 is suitably operable to generate a map 708 on the display 706. Preferably, the map 708 includes indicia corresponding to a plurality of alternative facility locations associated with a selected event. According to one embodiment of the subject application, the map 708 on the display 706 includes indicia corresponding to locations of a plurality of alternative document rendering devices.

The system 700 also includes a device selection data input 712 that is configured to receive user-supplied device selection data corresponding to at least one of the document rendering devices which is selected from the plurality of displayed alternative document rendering devices. In addition, the system 700 includes a temporal data input 714 operable to receive, from the associated user, temporal data corresponding to a time of the selected event. The system 700 also includes a job processor 716, which is configured to commence operation of each selected document rendering device in so as to render the at least one electronic document at a timing corresponding to the temporal data.

Figure 8:
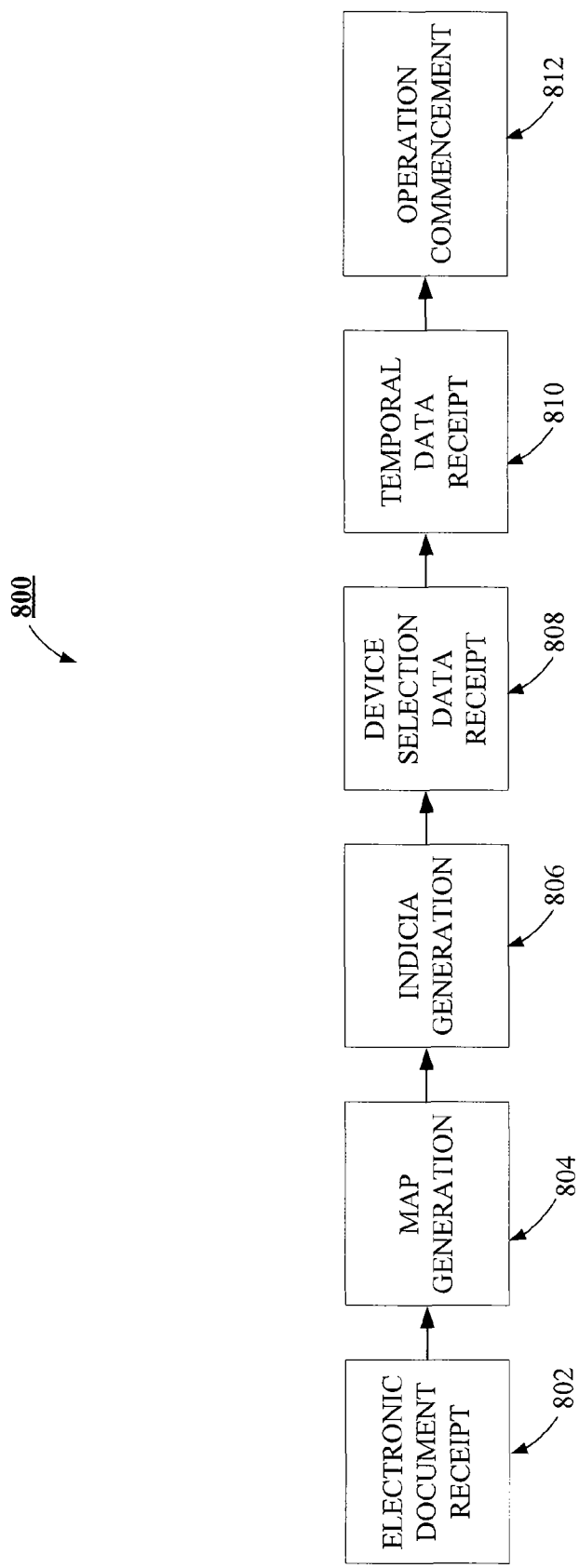
FIG. 8 is a functional diagram illustrating the location-based document output scheduling system according to one embodiment of the subject application.

Turning now to FIG. 8, illustrated is a functional diagram of a system 800 for location-based document output scheduling in accordance with one embodiment of the subject application. As shown in FIG. 8, electronic document data receipt 802 first occurs of at least one electronic document into an associated data storage. Map generation 804 is then performed on an associated display. Preferably the map resulting from the map generation 804 includes indicia corresponding to alternative facility locations associated with a selected event. Indicia generation 806 then occurs of indicia corresponding to locations of alternative document rendering devices.

Next, device selection data receipt 808 occurs of device selection data from an associated user. In accordance with one example embodiment of the subject application, such device selection data includes, for example and without limitation, one or more of the document rendering devices selected from the displayed alternative document rendering devices, and the like. Temporal data receipt 810 then occurs of temporal data from the associated user and corresponding to a time of the selected event. Operation commencement 812 is then performed of each selected document rendering device so as to render the at least one electronic document at a timing corresponding to the temporal data.

Figure 9:
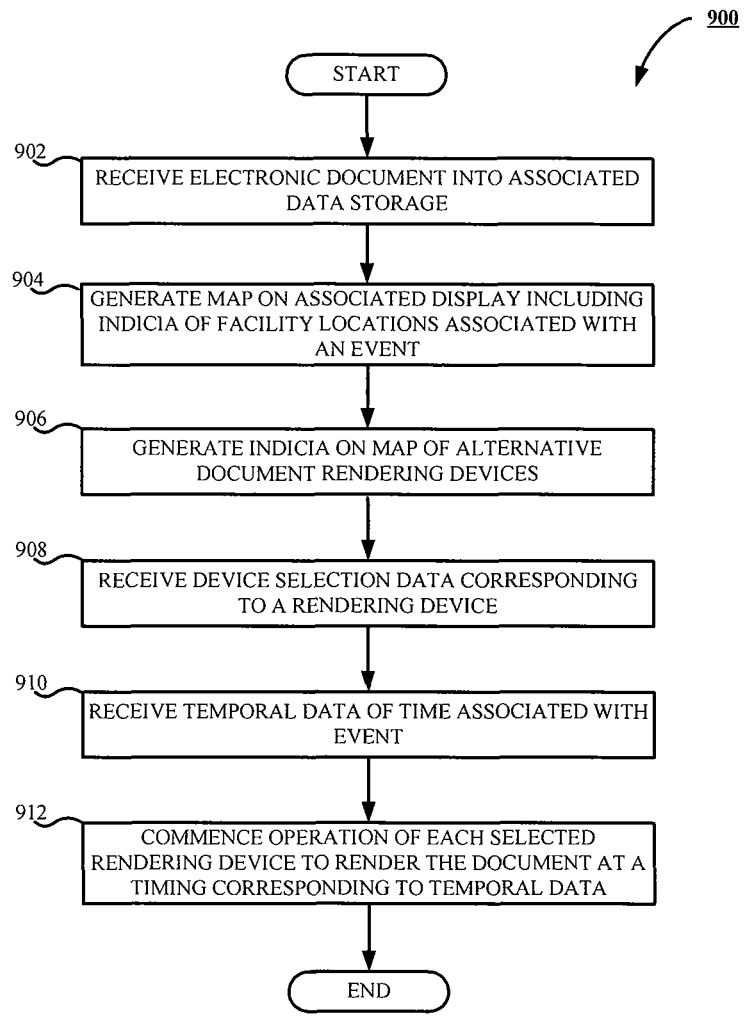
FIG. 9 is a flowchart illustrating a location-based document output scheduling method according to one embodiment of the subject application.

The skilled artisan will appreciate that the subject system 100 and components described above with respect to FIG. 1, FIG. 2, FIG. 3, FIG. 4, FIG. 5, FIG. 6, FIG. 7, and FIG. 8 will be better understood in conjunction with the methodologies described hereinafter with respect to FIG. 9 and FIG. 10, as well as the example illustration of FIG. 11. Turning now to FIG. 9, there is shown a flowchart 900 illustrating a location-based document output scheduling method in accordance with one embodiment of the subject application. Beginning at step 902, at least one electronic document is received into an associated data storage, e.g. the data storage devices 110, 120, 130, 160, or the like.

A map is then generated on an associated display at step 904 that includes indicia corresponding to a plurality of alternative facility locations associated with a selected event. It will be appreciated by those skilled in the art that such a display is capable of including, for example and without limitation, the user interfaces 106, 116, 126, the kiosks 134, 142, and 150, or the user device 164, and the like. At step 906, indicia is generated on the map corresponding to the locations of a plurality of alternative document rendering devices, e.g. the document rendering devices 104, 114, and 124. In accordance with one embodiment of the subject application, the facility locations and device locations are received from the server 158, which is configured to store and maintain a suitable repository of such associated data.

At step 908, device selection data is received from an associated user, such data corresponding to the selection of at least one of the alternative document rendering devices 104, 114, and 124. Temporal data corresponding to the time of the selected event is then received from the associated user at step 910. Thereafter, at step 912, operation of each selected document rendering device 104, 114, and 124 is commenced in order to render the at least one electronic document at a timing in accordance with the received temporal data.

Figure 10:
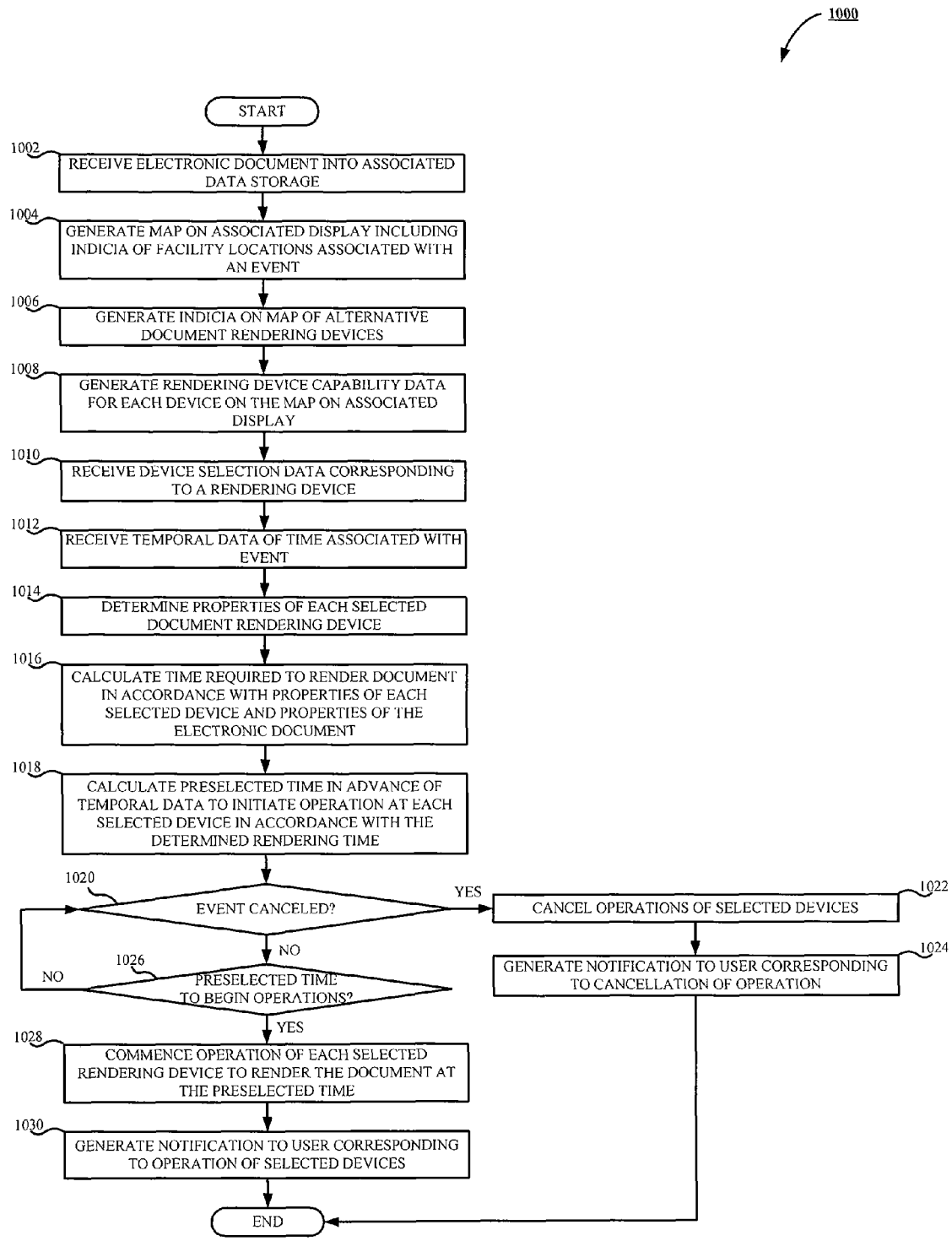
FIG. 10 is a flowchart illustrating a location-based document output scheduling method according to one embodiment of the subject application.
Figure 11:
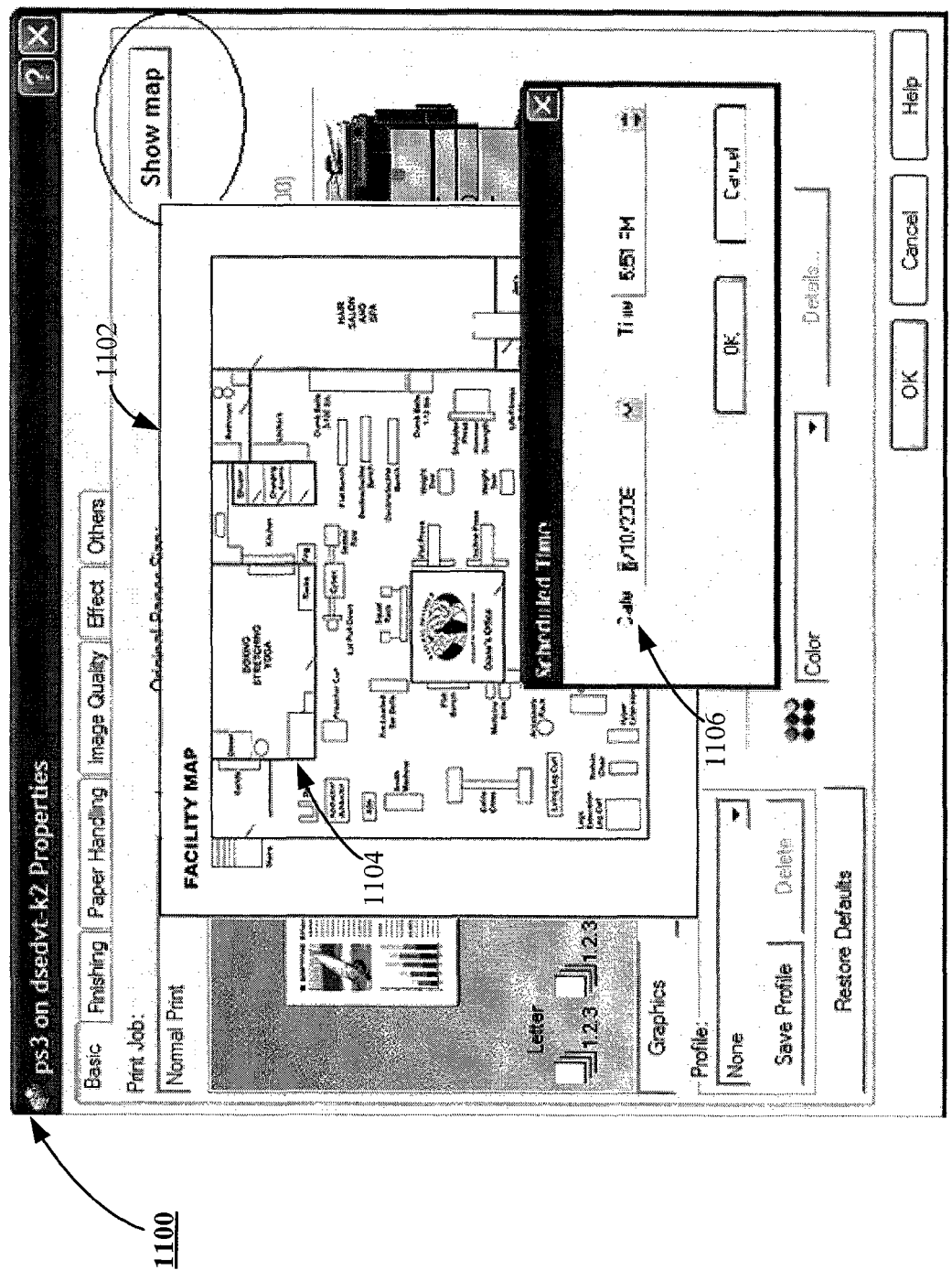
FIG. 11 is an example screen illustrating a user interface for use in the system and method for location-based document output scheduling according to one embodiment of the subject application.

Referring now to FIG. 10, there is shown a flowchart 1000 illustrating a method for location-based document output scheduling in accordance with one embodiment of the subject application. The methodology of FIG. 10 begins at step 1002, whereupon electronic document data corresponding to one or more electronic documents is received from an associated user for rendering by a selected document rendering device 104, 114, and/or 124. It will be appreciated by those skilled in the art that the document is capable of being received at one of the document rendering devices 104, 114, or 124, via the user device 164, or the server 158. For example purposes only, reference is made hereinafter to the user device 164 interacting with the associated user, however the skilled artisan will appreciate that such interaction is equally capable of occurring via the user interfaces 106, 116, or 126, the kiosks 134, 142, or 150, or other such device in data communication with the computer network 102.

At step 1004, the user device 164 generates a map on an associated display that includes indicia of facility locations associated with an event. The user device 164 then generates indicia on the map of alternative document rendering devices 104, 114, and 124. That is, the user device 164 generates a cartographical graphic of locations that include document rendering devices 104, 114, and 124 capable of outputting the received electronic document, e.g. a meeting room, a conference room, a convenience center, or the like. It will be appreciated by those skilled in the art that while reference is made herein to an event, the subject application is not limited solely to such an implementation, and other criteria associated with a document, i.e. output time, location user, or the like, is equally capable of being used in generating the map of locations. In accordance with one embodiment of the subject application, the user device 164 receives location information on the facility locations and alternative document rendering devices 104, 114, and 124 from a repository maintained by the server 158, an administrative device (not shown), by one of the rendering devices 104, 114, or 124, or the like.

Indicia representing the capabilities of each alternative rendering device 104, 114, and 124 is then generated on the map at step 1008. Suitable capability data includes, for example and without limitation, resource utilization, errors, processing power, color availability, output media, storage capacity, and the like. FIG. 11 illustrates a template user interface 1100 depicting the map 1102 in accordance with one example embodiment of the subject application. As shown in FIG. 11, the map 1102 of the template interface 1100 includes associated indicia 1104 corresponding to facility layout, device location, and the like. The user interface 1100 of FIG. 11 further includes time/date selection graphic 1106 enabling the receipt of temporal data as set forth in greater detail below. The skilled artisan will appreciate that the user interface 1100 is one example interface capable of implementation in accordance with the subject application and is not intended to limit the subject application thereto. Returning to FIG. 10, device selection data is then received from the associated user corresponding to one or more document rendering devices 104, 114, or 124 at step 1010. In accordance with one embodiment of the subject application, the user is prompted via the graphical display of the map 1102 to select one or more devices 104, 114, or 124 to render the electronic document.

At step 1012, temporal data of a time associated with the event is received from the associated user via the user device 164. It will be appreciated by those skilled in the art that such temporal data is capable of including, for example and without limitation, a meeting time, a meeting date, a desired output time, a desired output date, and the like. Following receipt of the temporal data, flow proceeds to step 1014, whereupon the user device 164 determines the properties of each of the selected document rendering devices 104, 114, and 124. Stated another way, the user device 164 receives data from the devices 104, 114, and 124, or from a suitable monitoring device, e.g. the server 158, which data corresponds to the current workload, errors, output media, resource usage data, and the like, of each selected device 104, 114, and 124.

At step 1016, a time required to render the document by each of the selected document rendering devices 104, 114, and 124 is calculated based upon the respective properties of each rendering device 104, 114, and 124, and the properties of the electronic document to be rendered. At 1018, a preselected time in advance of the time designated by the temporal data is then calculated so as to determine the time at which to initiate document rendering operations on each of the rendering devices 104, 114, and 124. In accordance with one embodiment of the subject application, the preselected time corresponds to the time calculated to complete rendering the document prior to the start time of the event. It will be appreciated by those skilled in the art that the preselected time at which to initiate operations is capable of varying in accordance with each individual selected rendering device 104, 114, and 124, such that each device 104, 114, and 124 is capable of having different start times taking into account the varying output capabilities of each device 104, 114, and 124, any associated errors, and the like.

Operations then proceed to step 1020, whereupon a determination is made whether the event for which document rendering is desired has been cancelled. That is, the user device 164 monitors a suitable calendar, appointment booking for the selected conference or meeting room, so as to determine whether the meeting for which the renderings are to be printed has been canceled. The skilled artisan will appreciate that such monitoring is capable of being undertaken by the server 158 monitoring operations of the network 102, by the user device 164, by any of the selected rendering devices 104, 114, or 124, or the like. Upon a determination at step 1020 that the event has been canceled, i.e. no renderings are needed, flow proceeds to step 1022. At step 1022, the operations of the selected document rendering devices 104, 114, and 124 corresponding to the event are canceled, i.e. removed from a print/processing queue. The user is then notified at step 1024 of the cancellation of operations and the methodology of FIG. 10 thereafter terminates.

When it is determined at step 1020 that the event has not been canceled, flow progresses to step 1026. A determination is made at step 1026 whether or not the preselected time has arrived to initiate rendering operations by the selected document rendering devices 104, 114, and 124. Upon a determination at step 1026 that the preselected time has not occurred, flow returns to step 1020 to determine whether the event associated with the operations has been canceled. Thereafter operations continue until a determination is made at step 1026 that the preselected time has arrived to begin operations at each of the selected document rendering devices 104, 114, and 124.

Once it is determined at step 1026 that the preselected time has arrived, flow proceeds to step 1028. At step 1028, operation of each selected document rendering device 104, 114, and 124 is commenced. As stated above, the skilled artisan will appreciate that each device 104, 114, and 124 is capable of having different preselected times in accordance with the calculations made above with respect to the properties, capabilities, location, features, and the like associated with each device 104, 114, and 124. At step 1030, a notification is generated to the user corresponding to the operation of the selected document rendering devices 104, 114, and 124. In accordance with one embodiment of the subject application, suitable notification includes, for example and without limitation, job commencement, job completion, operation error, error correction, and the like. It will be appreciate by those skilled in the art that such notification is capable of being communicated via electronic mail messaging, SMS message, pager, telephonic, graphical popup, or the like.

The foregoing description of a preferred embodiment of the subject application has been presented for purposes of illustration and description. It is not intended to be exhaustive or to limit the subject application to the precise form disclosed. Obvious modifications or variations are possible in light of the above teachings. The embodiment was chosen and described to provide the best illustration of the principles of the subject application and its practical application to thereby enable one of ordinary skill in the art to use the subject application in various embodiments and with various modifications as are suited to the particular use contemplated. All such modifications and variations are within the scope of the subject application as determined by the appended claims when interpreted in accordance with the breadth to which they are fairly, legally and equitably entitled.

What is claimed:

1. A location-based document output scheduling system comprising:
   a data storage;
   an input for receiving an electronic document into the data storage;
   a display;
   a display generator for generating a map on the display, the map including indicia showing locations on the map of a plurality of alternative facility locations suitable for use in hosting a selected event for which a printed copy of the electronic document will be created, the selected event having an event time at which the selected event will take place;
   the display generator further for generating, on the map, indicia showing locations of a plurality of alternative document rendering devices suitable for generating the printed copy of the electronic document;
   a device selection data input for receiving user-supplied device selection data identifying a selected document rendering device selected from the plurality of alternative document rendering devices;
   a temporal data input for receiving, from a user, temporal data including a user-selected time for completion of the document rendering operation, the user-selected time for completion of the document rendering operation being in advance of the event time for the selected event; and
   a job processor operable to commence operation of the selected document rendering device so as to complete the document rendering operation on the electronic document to thereby generate the printed copy by the user-selected time upon confirmation that the selected event has not been cancelled.

2. The system of claim 1 further comprising a notification generator for notifying the user of a status of the document rendering operation on the selected document rendering device.

3. The system of claim 1 further comprising means for generating, on the display, capability data identifying capabilities of each of the plurality of alternative document rendering devices.

4. The system of claim 2 wherein the status comprises at least one of commencement, job completion, and error associated with the document rendering operation.

5. The system of claim 1 wherein the job processor commences the document rendering operation on the selected document rendering device at a preselected time in advance of the user-selected time in order to complete the document rendering operation by the user-selected time.

6. The system of claim 5 wherein the preselected time is calculated based upon a property of the selected document rendering device and a property of the electronic document.

7. The system of claim 5 wherein the user-supplied device selection data includes a second selected document rendering device for rendering the electronic document and further wherein the job processor commences the document rendering operation on the second selected document rendering device at a preselected time in advance of the user-selected time in order to complete the document rendering operation by the user-selected time.

8. A location-based document output scheduling method comprising:
   receiving an electronic document into a data storage;
   generating a map on a display, the map including indicia showing locations on the map of a plurality of alternative facility locations suitable for use in hosting a selected event for which a printed copy of the electronic document will be created, the selected event having an event time at which the selected event will take place;
   generating, on the map, indicia showing locations of a plurality of alternative document rendering devices suitable for generating the printed copy of the electronic document;
   receiving, from a user, device selection data identifying a selected document rendering device selected from the plurality of alternative document rendering devices;
   receiving, from the user, temporal data including a user-selected time for completion of the document rendering operation, the user-selected time for completion of the document rendering operation being in advance of the event time for the selected event; and
   commencing operation of the selected document rendering device so as to complete the document rendering operation on the electronic document to thereby generate the printed copy by the user-selected time upon confirmation that the selected event has not been cancelled.

9. The method of claim 8 further comprising notifying the user of a status of the document rendering operation on the selected rendering device.

10. The method of claim 8 further comprising generating, on the display, capability data identifying capabilities of each of the plurality of alternative document rendering devices.

11. The method of claim 9 wherein the status comprises at least one of commencement, job completion, and error associated with the document rendering operation.

12. The method of claim 8 wherein the commencement of the document rendering operation on the selected document rendering device at a preselected time is sufficiently in advance of the user-selected time in order to complete the document rendering operation by the user-selected time.

13. The method of claim 12 wherein the preselected time is calculated based upon a property of the selected document rendering device and a property of the electronic document.

14. The method of claim 12 wherein the user-supplied device selection data includes a second selected document rendering device for rendering the electronic document and further wherein the document rendering operation commences on the second selected document rendering device at a preselected time in advance of the user-selected time in order to complete the document rendering operation by the user-selected time.

15. A location-based document output scheduling system comprising:
   a data storage;
   means for receiving an electronic document into the data storage;
   means for generating a map on a display, the map including indicia showing locations on the map of a plurality of alternative facility locations suitable for use in hosting a selected event for which a printed copy of the electronic document will be created, the selected event having an event time at which the selected event will take place;
   means for generating, on the map, indicia showing locations of a plurality of alternative document rendering devices suitable for generating the printed copy of the electronic document;
   means for receiving, from a user, device selection data identifying a selected document rendering device selected from the plurality of alternative document rendering devices;

means for receiving, from the user, temporal data including a user-selected time for completion of the document rendering operation, the user-selected time for completion of the document rendering operation being in advance of the event time for the selected event; and job output means for commencing operation of the selected document rendering device so as to complete the document rendering operation on the electronic document and to thereby generate the printed copy by the user-selected time upon confirmation that the selected event has not been cancelled.

16. The system of claim 15 further comprising means for generating a notification to the user of the status of the selected rendering operation and wherein the status comprises at least one of commencement, job completion and error associated with the document rendering operation.

17. The system of claim 15 further comprising means for generating, on the display, capability data identifying capabilities of each of the plurality of alternative document rendering devices.

18. The system of claim 15 wherein the job output means includes means for commencing operation of the selected document rendering device at a preselected time in advance of the user-selected time of the document rendering operation in order to complete the document rendering operation by the user-selected time.

19. The system of claim 18 wherein the preselected time is calculated based upon a property of the selected document rendering device and a property of the electronic document.

20. The system of claim 18 wherein the user-supplied device selection data includes a second selected document rendering device for rendering the electronic document and further wherein the job output means commences the document rendering operation on the second selected document rendering device at a preselected time in advance of the user-selected time in order to complete the document rendering operation by the user-selected time.

* * * * *